(12) United States Patent
Jaiswal et al.

(10) Patent No.: US 11,888,673 B2
(45) Date of Patent: Jan. 30, 2024

(54) SYSTEM AND COMPUTER-IMPLEMENTED METHOD FOR MOVING OBJECT DETECTION AND LOCATION DETERMINATION USING DELAY RATE SPECTRUM

(71) Applicant: VEHERE INTERACTIVE PRIVATE LIMITED, West Bengal (IN)

(72) Inventors: Naveen Jaiswal, Kolkata (IN); Koyel Das, Kolkata (IN)

(73) Assignee: VEHERE INTERACTIVE PRIVATE LIMITED, Kolkata (IN)

( * ) Notice: Subject to any disclaimer, the term of this patent is extended or adjusted under 35 U.S.C. 154(b) by 0 days.

(21) Appl. No.: 18/073,945

(22) Filed: Dec. 2, 2022

(65) Prior Publication Data

US 2023/0179463 A1 Jun. 8, 2023

(51) Int. Cl.
*H04L 27/26* (2006.01)
*H01Q 3/26* (2006.01)

(52) U.S. Cl.
CPC ......... *H04L 27/265* (2013.01); *H01Q 3/2682* (2013.01)

(58) Field of Classification Search
CPC ............................ H04L 27/265; H01Q 3/2682

USPC ......................................................... 375/262
See application file for complete search history.

(56) References Cited

U.S. PATENT DOCUMENTS

| | | | | |
|---|---|---|---|---|
| 2004/0004569 A1* | 1/2004 | Lam | ...................... | G01S 13/904 342/351 |
| 2009/0318779 A1* | 12/2009 | Tran | ...................... | A61B 5/411 600/595 |
| 2022/0260701 A1* | 8/2022 | Doerr | .................... | G01S 13/931 |
| 2022/0392347 A1* | 12/2022 | Ataie | .................... | H04W 4/027 |

\* cited by examiner

*Primary Examiner* — Hirdepal Singh
(74) *Attorney, Agent, or Firm* — Dragon Sun Law Firm, PC; Nathaniel Perkins

(57) ABSTRACT

A system for detecting a moving object is provided. The system comprises a detector module having a first antenna and a second antenna separated by a baseline distance. The system also comprises a processing module configured to receive a first signal and a second signal from the first receiving antenna and the second receiving antenna, respectively. The processing module is further configured to determine a delay rate spectrum followed by a 2D FFT for the first signal and the second signal based on a cross-correlation function and an observation time period. The delay rate spectrum is then used to detect the moving object and determine its location in terms of latitude and longitude coordinates.

5 Claims, 14 Drawing Sheets

SYSTEM AND COMPUTER-IMPLEMENTED METHOD FOR MOVING OBJECT DETECTION AND LOCATION DETERMINATION USING DELAY RATE SPECTRUM

CROSS-REFERENCE TO RELATED APPLICATION

This application claims priority from the Indian patent application 202131055931 filed Dec. 2, 2021, the content of which are incorporated herein in the entirety by reference.

FIELD

The present disclosure generally relates to detection of moving objects, and more specifically, to detection of unmanned aerial vehicles (UAVs).

BACKGROUND

Unmanned Aerial Vehicles (UAVs) are a class of moving objects that do not require human presence onboard for their navigation. They are also commonly referred to as "drones" and were originally developed for use in military operations and missions where physical reach of humans was challenging. However, their use has now rapidly expanded to commercial, scientific, recreational, agricultural, and other applications, such as patrolling, surveillance, product deliveries, aerial photography, and the like. With increasing use of such moving objects or drones, and their presence in air space, there is also a concern that they may pose a serious threat to privacy and national security, if they are wrongly used by unscrupulous entities for wrong activities such as spying, monitoring confidential activities without coming into notice and the like. As a result, one or more drone surveillance systems are required to detect the presence of drones, particularly, in drone prohibited areas.

Conventional UAV (or equivalently drone) detection systems can be broadly categorized into active systems and passive systems. Active systems are configured to emit a radio frequency pulse towards a target, such as the UAV, and search for reflected pulse from the target to determine the presence of the target, which may be the UAV. The active systems, such as RADARs, have a high range but are themselves detectable by UAV operators which may caution them to prevent UAVs to be detected by such systems.

Passive systems on the other hand are configured to passively receive the frequency transmitted by a source object or transmitter associated with the source object to identify said source object. An example of passive system includes, but is not limited to, a phased array system. The phased array system is configured to detect a change in direction of frequency radiation incoming from the source object, such as an RF source, and thus sense the motion of the source. However, the array configuration in the phased array systems cannot be fixed for a wide band of frequencies. Further, it is difficult to maintain consistency in spacing between antennas of the phased array system, which makes it difficult to achieve same beam shape for wide range of frequencies. Another example of passive system is an array of directional antennas which includes a large number of small beam antennas to detect movement of UAVs such as drones. However, implementation of such a system is costly, as it requires a large number of antennas to cover a large number of directions. Yet another example of passive systems are acoustic systems which are relatively cheaper, but these systems lack precision due to surrounding noise and interference from other RF emitting sources around the UAV.

Therefore, alternative methods and systems that are able to detect the moving objects, like UAVs or drones, with more accuracy, cost efficiency, and consistency of operation may be more beneficial.

SUMMARY

Certain embodiments of the present disclosure provide better and easy solutions to the problems and needs in the art that have not yet been fully identified, appreciated, or solved by current technologies.

In one embodiment, a system for detecting a moving object (also interchangeably referred to hereinafter as UAV or drone) is provided. The system comprises a detector module comprising at least two antennas: a first antenna and a second antenna. The first antenna and the second antenna are separated by a baseline distance. The system further comprises a processing module comprising one or more processors, the processing module being configured to receive a first signal from the first antenna and a second signal from the second antenna. The processing module is further configured to determine a delay-rate spectrum for the first signal and the second signal based on a cross-correlation function followed by a 2D Fourier transform, and an observation time period. The cross-correlation function is determined based on determining at least a delay, a rate, or a combination thereof, between the first signal and the second signal based on a mathematical correlation function. Further, the processing module is configured to detect the moving object based on the determined delay-rate spectrum. The observation time period comprises at least a slow object time period and a fast object time period.

In another embodiment, a method for detecting a moving object is provided. The method comprises receiving a first signal from a first antenna and a second signal from a second antenna. The method further comprises determining a delay rate spectrum for the first signal and the second signal based on a cross-correlation function followed by a 2D Fourier transform and an observation time period. The cross-correlation function along with the 2D Fourier transform comprises determining at least a delay, a rate, or a combination thereof, between the between the first signal and the second signal based on a mathematical correlation function. The method also comprises detecting the moving object based on the determined delay-rate spectrum. The observation time period comprises at least a slow object time period and a fast object time period.

These and other advantages will be apparent to those of ordinary skill in the art by reference to the following detailed description and the accompanying drawings.

BRIEF DESCRIPTION OF THE DRAWINGS

In order that the advantages of certain embodiments of the disclosure will be readily understood, a more particular description of the disclosure briefly described above will be rendered by reference to specific embodiments that are illustrated in the appended drawings. While it should be understood that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION OF THE EMBODIMENTS

Figure 1A:
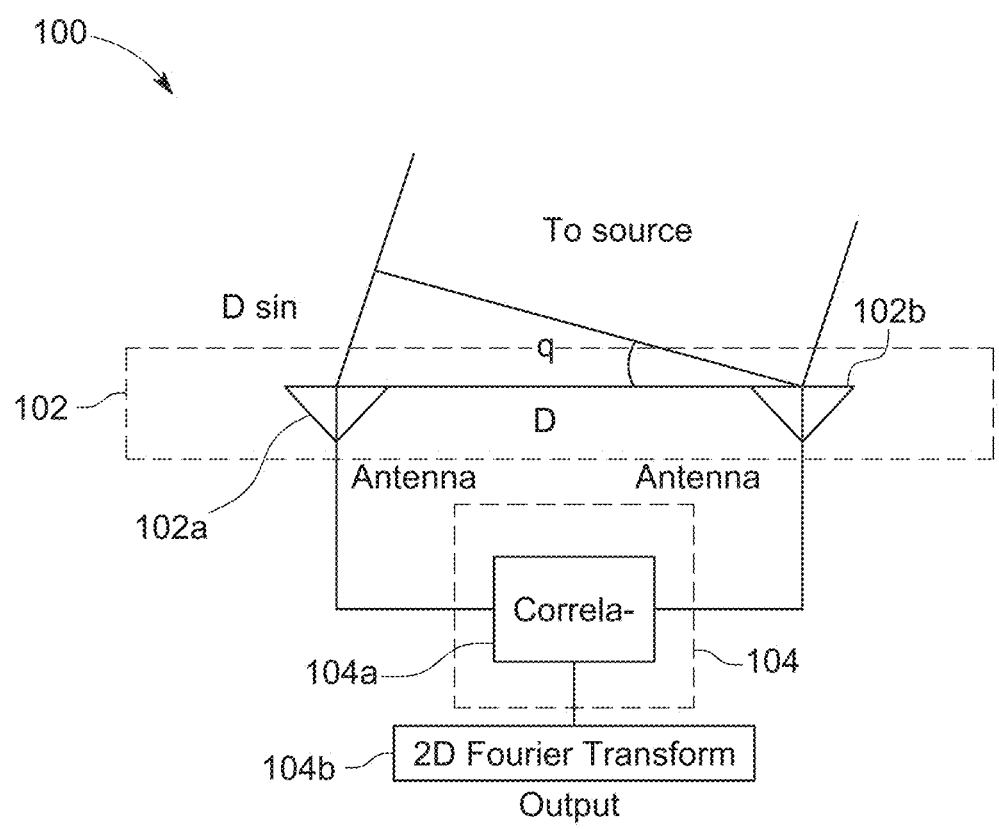
FIGS. 1A and 1B are architectural diagrams illustrating a system for detection of a moving object, according to an embodiment of the present disclosure.

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), may be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Some embodiments pertain to a system (which may also be referred as a "computing system") configured to detect moving objects such as UAVs or drones, specifically in areas where their presence is prohibited. It may be understood that hereinafter, moving objects, drones and UAVs may be interchangeably used to mean the same, that is type of objects, specifically aerial vehicles, that do not require presence of any human operator onboard, and usage of any term is not to be construed as limiting in any regard.

The detection of the moving objects may be done to identify approximate latitude and longitude of the moving object. This is accomplished by using more than one system to detect the delay rate spectrum for an arrangement of at least two antenna systems, each of which is an array of sectored directional antennas covering 3D, that are separated by a predefined baseline distance. Further, a correlation is identified between peaks in the delay rate spectrums of the sectors pointing in the same direction (that is to say corresponding sectors) of the two systems, and this correlation is then used to estimate the location of the moving object in terms of its latitude, longitude, and the direction of the moving object. Various embodiments disclosed herein are based on the principles such as radio interferometry and using phase rate and spatial frequency to detect moving radio sources like drones. Radio interferometry is a technique which is widely used in radio astronomy especially for imaging of astronomical sources. The systems and methods disclosed herein use application of principles of radio interferometry to provide enhanced range of detection and is configured to be better at mitigation of false alarms, than the known systems in the art based on the same principles. The existing solutions suffer from the problems like short range due to comparable stationary interferences combining with moving source signal and masking the source in the detection system and also having large number of false alarms that arise in moving object detection. Further the systems and methods disclosed herein use simpler geometry of antennas to achieve that various advantages described herein, as will be described in the various embodiments and accompanying figures included herein.

Figure 1B:
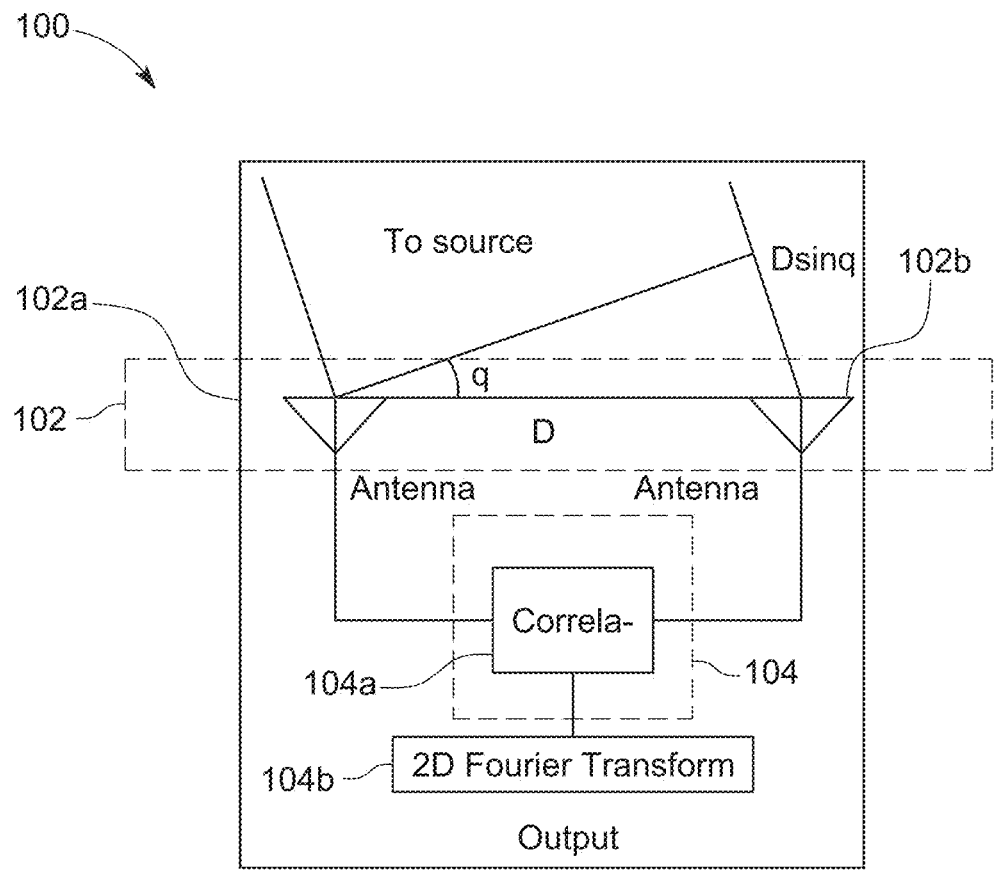

FIG. 1A and FIG. 1B illustrate architectural diagrams for a system 100 for detection of a moving object, according to an embodiment of the present disclosure. The components in FIG. 1A and FIG. 1B are same, except for the direction of the moving object to be detected. In FIG. 1A, the moving object is on the right direction, while in the FIG. 1B, the moving object is in the left direction. Thereby, for the sake of brevity, FIG. 1A will be explained in detail. However, as one of ordinary skill in the art will understand, the same explanation also applies to FIG. 1B, without deviating from the scope of the present disclosure.

The moving object may be referred to as a source because it acts as a source of RF signals. The system 100 is based on an architecture that enables separation of interference sources from a main signal sent from the moving object and hence helps in mitigating false alarms in detection of the moving object.

The system 100 describes the architecture that forms a basis of radio interferometry and comprises a detector module 102 comprising at least two antennas, a first antenna 102a and a second antenna 102b, separated by a baseline distance D. The signals are received by the two antennas, 102a-102b, are cross-correlated to get the visibility of the moving object.

The system 100 comprises a processing module 104 that further comprises a correlation module 104a and a 2D Fourier Transform module 104b which is configured to implement a cross-correlation function to find the cross-correlation, followed by a 2D Fast Fourier Transform (FFT), between a first signal received from the first antenna 102a and a second signal received from the second antenna 102b. The cross-correlation function followed by 2D FFT comprises determining at least a delay, a rate, or a combination thereof, between the between the first signal and the second signal based on a mathematical correlation function.

In addition, the processing module 104 is configured to determine an observation time period for observation of the moving object. The observation time period is a time period which may be adjusted according to the speed of the moving object. The observation time period for a fast-moving object is a fast object time period and the observation time period for a slow-moving object is a slow object time period. In some embodiments, the fast object time period may be o.01 s and the slow object time period may be 1 s. Having the different observation time periods in this manner provides the advantage that any speed of the moving object may be detected, and false alarms may be mitigated accordingly.

The system 100 is configured to use the observation time period and the cross-correlation function followed by 2D FFT implemented by the correlator module 104a and the 2D Fourier Transform module 104b to determine a delay-rate spectrum for the first signal and the second signal. The delay-rate spectrum is then used to detect the moving object. The delay-rate spectrum may be used to detect and locate moving sources, such as the moving object under consideration, and separate interferences thus increasing detection probability of far-off signals in presence of interferences and mitigating false alarms. The delay-rate spectrum also enables getting the angle q of FIG. 1 of a far-away radio source, such as the moving object.

The delay-rate spectrum is a plot of delay value with a fringe rate, or rate, and depicts delay in one dimension and fringe rate in the other dimension. In some embodiments, the delay-rate spectrum comprises a 2D array. The magnitude of the values in this array are signal strength or amplitude values. The delay is basically the delay difference of the source, that is the moving object, from the two antennas 102a-102b. The delay resolution decides if the two delays can be separated or not and the rate resolution defines if the rates may be separated or not. The delay resolution is set by the sampling rate, that is if the sampling rate is fs, then the delay resolution is 1/fs. So, suppose that in an embodiment, the sample rate is 100 MHz then the delay resolution will be 10 ns. Delay resolution defines a threshold delay value and two delays which have a difference less than the delay resolution threshold value cannot be separated by the system 100. For example, if the delay resolution is 10 ns, then anything less than 10 ns will fall on the 0-delay line in the delay-rate spectrum, or two delays have difference less than 10 ns they will fall on the same delay line. The delay-rate spectrum will be illustrated in greater detail in FIGS. 5A-5B.

Various embodiments also provide a rate resolution for the system 100, which is set by the total duration of data acquisition from the moving object. So, if data acquisition duration is 1 s then rate will be 1 Hz. Further, lesser is the total acquisition duration, coarser will be the rate resolution. Just like delay resolution, the rate resolution defines a rate threshold value for depicting the fringe rate in the delay-rate spectrum. For example, if rate resolution is 1 Hz, then two rates that have a difference less than 1 Hz and all the rates below 1 Hz will fall to 0 rate and cannot be separated.

The delay-rate spectrum implemented by the processing module 104, in combination with the specification of the observation time period provides enhanced detection of moving objects with lesser false alarms. Also, the system 100 uses at least two antennas 102a and 102b, but a greater number of antennas may be added to capture the moving object from many directions, as will be illustrated in FIG. 3.

Further, the at least two antennas 102a-102b are separated by the baseline distance D, which may be configured suitably to mitigate interference from sources other than moving objects and also capture the visibility sufficiently. For example, in an example arrangement, the antennas 102a-102b may be kept at a height of minimum 9 feet in open areas and min 30 feet in areas with buildings, so that the antennas will only receive reflections from moving objects at or above the antenna height. In some scenarios, if there are people moving in the balcony of a building having the antennas atop it, sending out reflections from people will not pose any problem as their signal will land up in the delay bins as same as of the building which is stationary, so they will not be differentiated from the reflections from building and will appear stationary. Further it may be noted that people cannot move at 1 m/s so if every signal that shows a rate corresponding to less than 1 m/s motion is disregarded by the system 100, then false alarms due to human movements are easily mitigated.

The system 100 using the delay-rate spectrum to detect moving objects is configured to mitigate false alarms and thus increase the accuracy of detection of the moving object.

The whole problem of detection of the moving object based on the delay-rate spectrum is divided according to the speed of the moving object and the fringe rate it produces. In an example, a frequency range from 300 MHz to 6 GHz is spanned for the detection, with an antenna configuration having baseline distance D as 200 m. Such a configuration may be simulated using MATLAB™ and other similar tools and is illustrated in FIG. 2.

Figure 2:
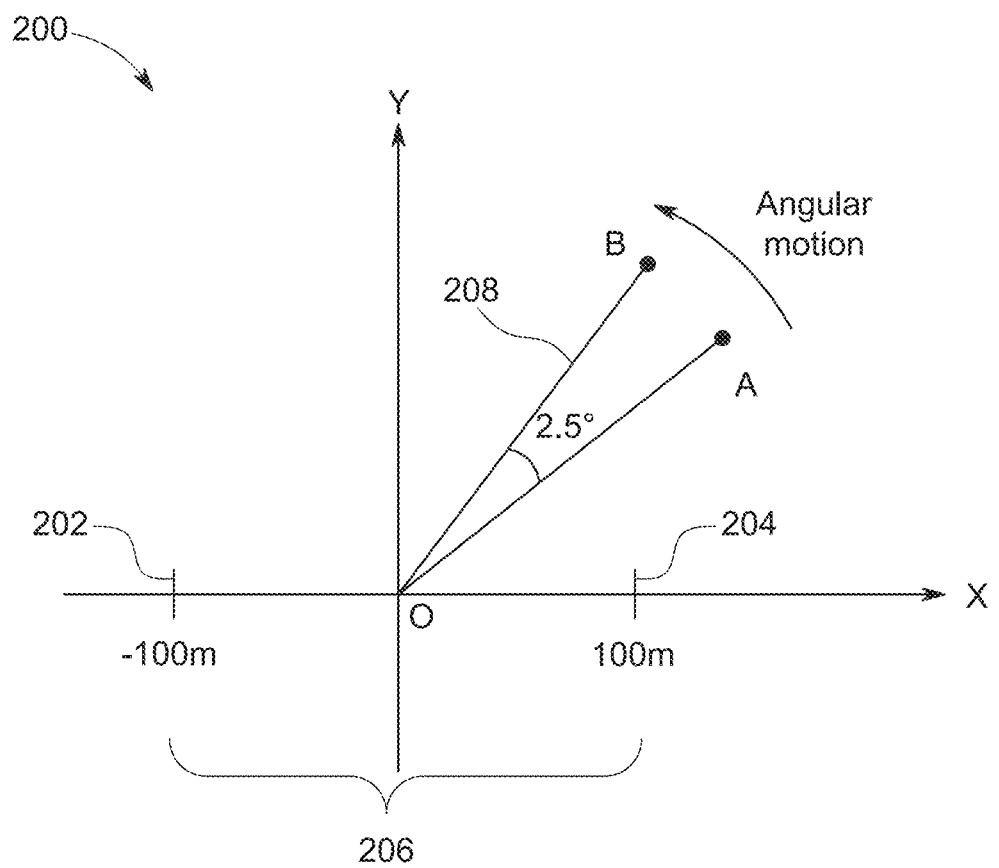
FIG. 2 is a schematic diagram illustrating a geometrical configuration of placement of a plurality of antennas for detecting a moving object, according to an embodiment of the present disclosure.

FIG. 2 is a schematic diagram illustrating a geometrical configuration 200 of placement of a plurality of antennas for detecting a moving object, according to an embodiment of the present disclosure.

The geometrical configuration 200 includes a reference coordinate system of axes, having an X-axis and a Y-axis, showing distance values corresponding to placement of antennas. In the geometrical configuration 200, two antennas, such as a first antenna 202 and a second antenna 204, which may equivalent to antennas 102a and 102b described in FIG. 1 previously, are placed at −100 m and +100 m on the X-axis. Thus, baseline separation 206 between the two antennas 202 and 204 is 200 m. Such a selection of baseline length ensures that even for small angular movements of a target the delays in the delay-rate space in two angular positions will be separable. When delay-rate spectrum of the same capture of data is produced, once an observation time of 0.01 seconds may be used and another observation time of 1 seconds may be used, to capture both fast and slow speed moving objects.

The geometrical configuration 200 illustrates two positions A and B of a moving object, which have an angular separation of 2.5 degrees. When detected on the using the baseline separation 206 of 200 m shown in the geometrical configuration 200, these two positions produce a 17 ns delay. So, when a delay-rate spectrum with a 10 ns delay resolution is used, this delay is observed in the first or second pixel of the delay space.

In the geometrical configuration 200, the center of the baseline separation 206 coincides with the origin of the axes, thus making the geometrical configuration 200 a symmetrical configuration. In some embodiments, when an unsymmetrical geometrical configuration of antennas configuration is used, that is to say, when center of baseline separation 206 does not coincide with origin of the reference coordinate system axes, then the unsymmetrical system may have subsidized angular displacement for same type of angular motion of the moving object.

Figure 3A:
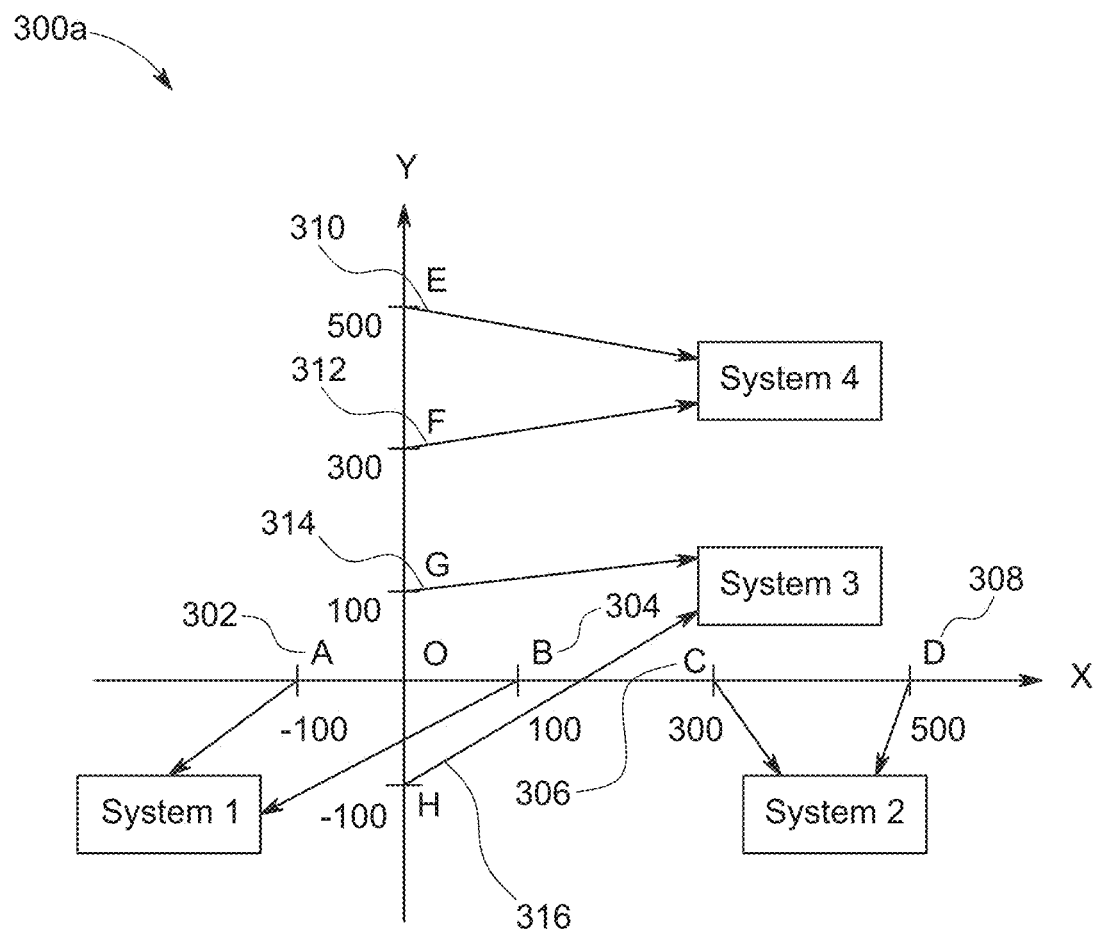
FIGS. 3A and 3B are schematic diagrams illustrating an alternate geometrical configuration of placement of a plurality of antennas for detecting a moving object, according to an embodiment of the present disclosure.
Figure 3B:
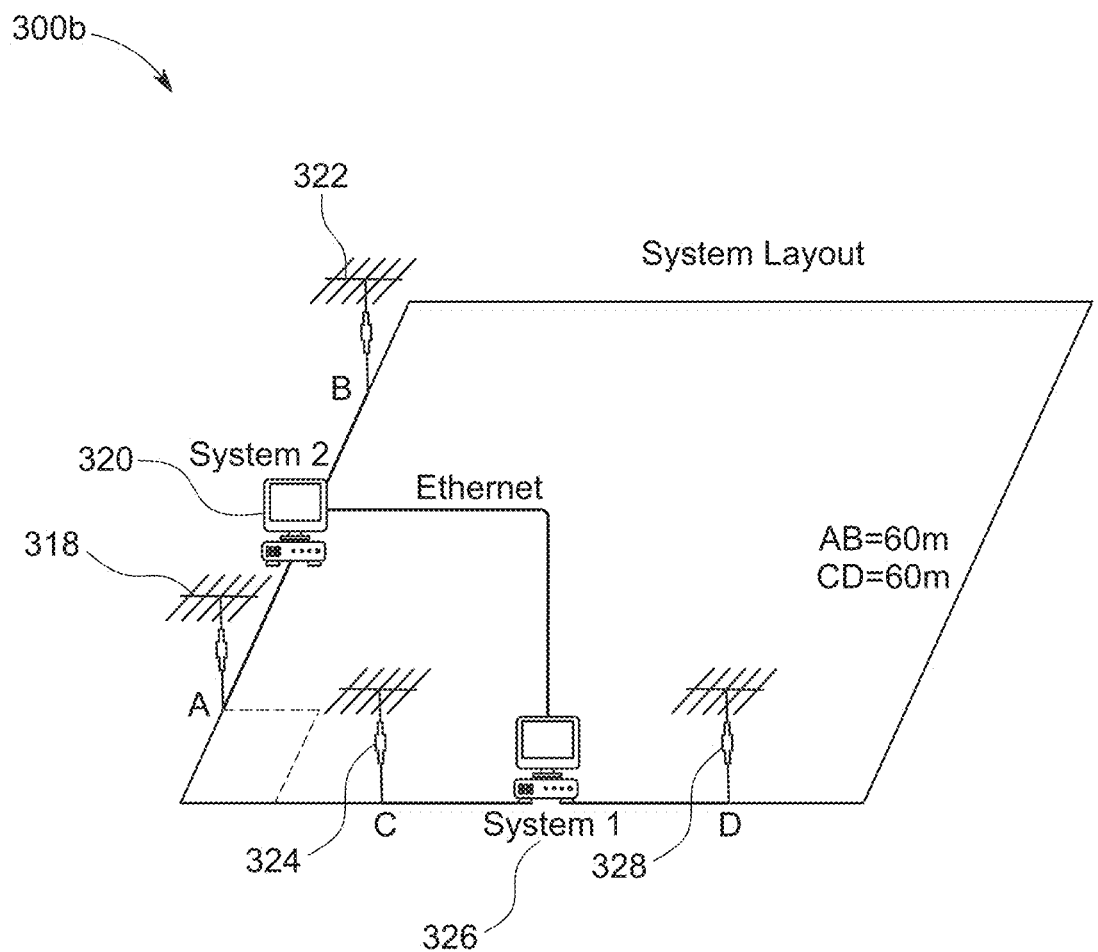

In some embodiments, alternate geometrical configurations may be used, such as depicted in FIG. 3A-3B, for detection of the moving object.

FIG. 3A is a schematic diagram illustrating an alternate geometrical configuration 300a of placement of a plurality of antennas for detecting a moving object. The geometrical configuration 300a comprises a coordinate system of axes comprising the X-axis and the Y-axis as earlier. The plurality of antennas are placed at points corresponding to locations 302, 304, 306, 308, 310, 312, 314, and 316. There are multiple moving objects that may be detectable by this geometrical configuration 300a. Each of the systems may correspond to a receiver for receiving signals from the moving objects.

Each of these systems is configured to receive signals from at least two antennas from the plurality of antennas placed at points 302-316. For example, system 1 is configured to receive signals from antennas placed at points 302 and 304; system 2 is configured to receive signals from antennas placed at points 306 and 308; system 3 is configured to receive signals from antennas placed at points 314 and 316; and system 4 is configured to receive signals from antennas placed at points 310 and 312.

Further, it may be possible that these systems detect moving objects that are of different speeds. Some may be fast moving objects and have high speed, while others may be slower. So accordingly, the observation time period, and rate resolution, for each moving object may be different. For example, a 1 second observation time period and its corresponding collected data produces a rate resolution of 1 Hz, and a 0.01 second of observation time period and its corresponding collected data, produces a rate resolution of 100 Hz. The rate resolution of is rate resolution can resolve slow flying targets like moving objects flying at 1 m/s in rate and delay, but if the target is fast enough saying more than 20 m/s then according to its path it may cover a wide angular displacement as a result of which the delay will get spread in one second observation time. Now since the delay will spread in pixels, the power due to the moving object will get divided among the delay pixels where it is spread so it may be difficult to localize in delay. However, if for such a moving object, 0.01 s observation time period is used, it can be localized in delay as even for the fastest kind of drones 0.01 s movement gives only 2 m displacement and can be considered stationary so we the peak in delay may be concentrated to one or very few pixels in a corresponding delay-rate spectrum, and thus can be localized. But then the rate becomes coarse the resolution being 100 Hz, so anything that produces a fringe rate less than 100 Hz will fall in the 0-rate column.

The fringe rate of a moving object is given by $$\text{Rate} = (dP\_d/dt)/\text{lambda} = D*(d\sin(q)/dt)/\text{lambda} \qquad \text{Eq. (1)}$$

P_d=D sin(q) shown in FIG. 1

Where P_d is the path difference of the moving object with respect to the baseline, lambda is the wavelength of observation, q is the angle of the direction of the moving object w.r.t the baseline. For small q, this equation translates to $$\text{Rate} = D*(d(q)/dt)/\text{lambda} \qquad \text{Eq. (2)}$$
$$= D*v/(R*\text{lambda}) \qquad \text{Eq. (3)}$$

Where v is component of velocity of the moving object parallel to baseline and R is the distance of the moving object from the baseline. The q will not be small always and this is a special case but to explain, an example may be considered.

In an example embodiment, at 300 MHz a target, that is a moving object, may be flying with a component of velocity parallel to baseline being 10 m/s at a distance of 100 m from the 200 m baseline then, using the Eq. (3), the rate is, 20 Hz for small angles. This cannot be resolved from the 0-rate row in the 0.01 s observation time as rate resolution is 100 Hz but can be localized as it has moved only 0.1 m in 0.01 s. This can be resolved in 1 s observation time as rate resolution is 1 Hz so the 20 Hz will fall on 20th pixel of rate but if the signal spreads in delay and merges with noise, it may be difficult to tell from this data which delay and rate to use. So then, the first data set giving location of the moving peak in delay is used. This speed in 100 m from the baseline, makes an angular movement of 5 degrees in is which is resolvable if the geometry is as in FIG. 2. For other unsymmetrical geometries, the angular displacement will be lower hence the signals can be better localized in delay.

Referring back to FIG. 2, 5 degrees as in FIG. 2 will be a spread from 3 to 4 pixels for 10 ns delay resolution and is still localizable. But a speed at say 95 m/s at 100 m from the antenna, the angular displacement will be 39 pixels, so it is hard to localize. The 0.01 s observation on the other hand will be able to localize this though only giving an upper limit of rate at this frequency. It is suitable for fast moving objects. If the speed is 100 m/s at 300 MHz, then it may be resolvable in 0.01 s observation time period as resolution is 100 Hz. For higher frequencies, the same speed or lower will produce higher fringe rates and hence may be resolved more easily.

So, for the velocities and wavelengths that produces fringe rates more than 100 Hz, they may be resolved in rate for 0.01 s observation time period. In FIG. 2 geometry, the whole space is symmetrical to the baseline, and so a drone flying with component of speed parallel to the baseline at 1 m/s at a distance of 1 km from the baseline will be detectable. So, components of speeds parallel to the baseline below 20 m/s of all frequencies (300 MHz to 6 GHz) can be resolved in delay and rate for 1 s observation time period as the delay spread is not enormous for a 200 m baseline. And speeds between 20 m/s to below 100 m/s of frequencies below that produces speed/wavelength less than 100 Hz and cannot be localized by 1 s observation time period, will produce spread in delay for 1 s observation time period data and hence can be localized by 0.01 s observation time period data and their rate cannot be resolved from the 1st rate axis or 100 Hz, which is their rate's upper limit. Even though the rate may not be non-zero rate, still it may be determined that the target is moving since its delay location will change with time. So, the delay-rate spectrum may be computed for both 1 s and 0.01 s observation time period. Further the values of 0.01 s and 1 s are configurable, and may be suitable changed, as per the type and speed of moving object.

Thus, using the geometrical configurations shown in FIG. 2 and FIG. 3A, and FIG. 3B, from delay, it may be estimated that what is the location of the target.

Further, this is accomplished by using more than one system to detect the delay rate spectrum for an arrangement of at least two antennas, that are separated by a predefined baseline distance. Further, a correlation is identified between peaks in the delay rate spectrums of each of the systems and this correlation is then used to estimate the latitude, the longitude, and the direction of the moving object. Further from rate, it may be estimated whether the target is moving or not. The directions given by two baselines can be intersected to get the exact location coordinates of the moving object in precise lat-long terms. Such a system is shown in the configuration of FIG. 3B.

As shown in FIG. 3B, the configuration 300b of multiple systems comprises an antenna 318 and an antenna 322 with a baseline distance of separation as 60 m and a system 320 configured to receive signals from the antennas 318 and 322.

Further the configurations 300b comprises an antenna 324 and an antenna 328 with a baseline distance of separation as 60 m and a system 326 configured to receive signals from the antennas 324 and 328. For the sake of simplicity, only two systems are shown in the configuration 300b shown in FIG. 3B. However any number of systems may be possible for a multi-system configuration, without deviating from the scope of the present disclosure. The system 320 and the system 326 may further be communicatively connected to each other, such as over an Ethernet connection, or any other wireless connection.

In an embodiment, the detection of moving object using the antennas 318 and 322 comprises, determining delay rate spectrum for the moving object using each of the systems 320 and 326. Further, from the delay rate spectrums identified by both the systems 320 and 326, peaks of the both the delay rate spectrums may be identified. Further, the peaks from both the delay rate spectrums may be correlated to identify the latitude, the longitude, and the direction of the moving object.

Each of the antennas 318, 322, 324, and 328 may be sectored antennas, such that corresponding sectors of two antennas may be correlated followed by the 2D FFT, to get corresponding delay rate spectrums.

Figure 3C:
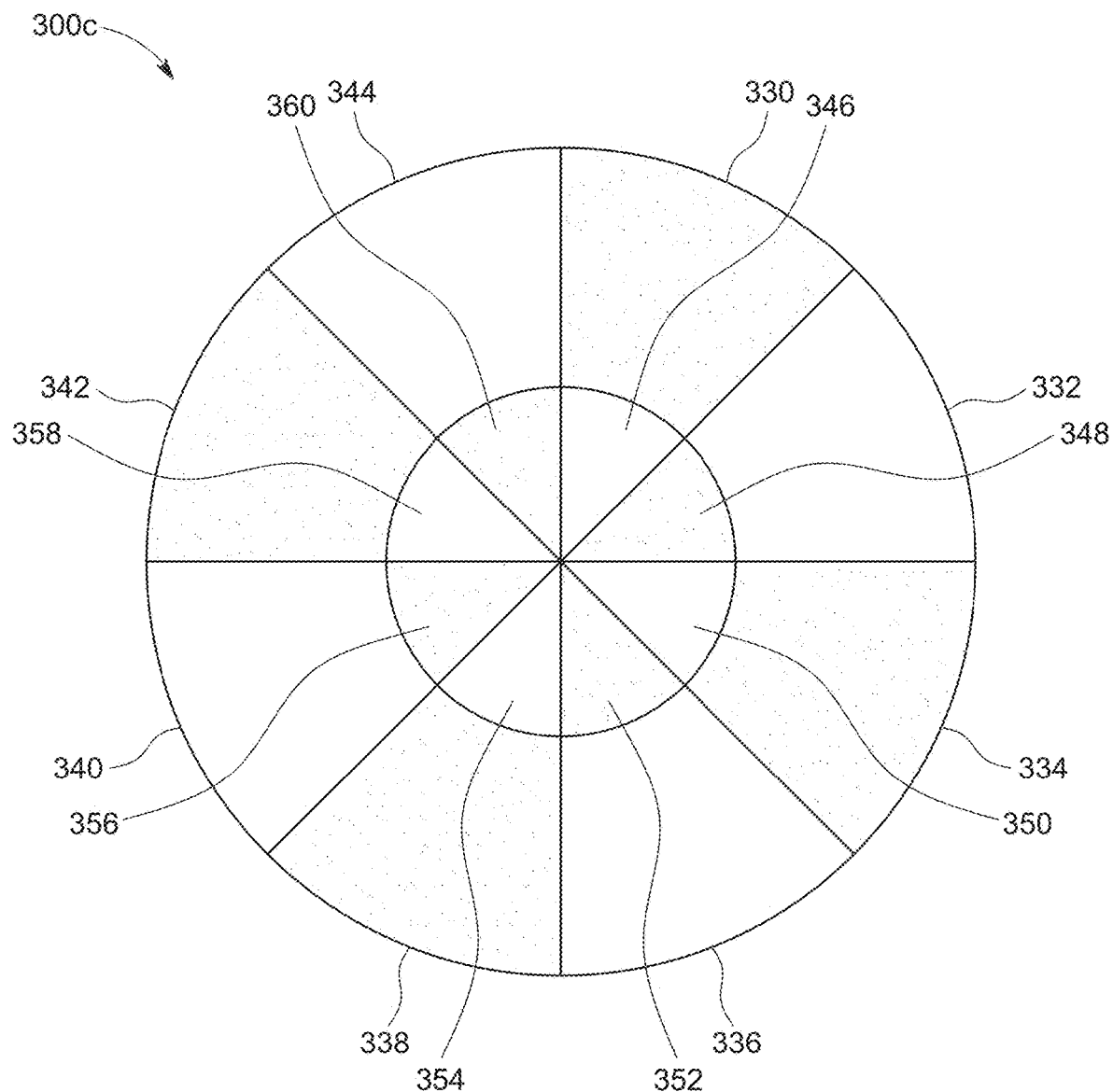
FIG. 3C is a schematic diagram of a sectored antenna used for detecting the moving object in the system shown in FIGS. 3A and 3B, according to an embodiment of the present disclosure.

FIG. 3C shows a schematic diagram of such a sectored antenna 300b. The antenna shown in FIG. 300b has 8 sectors 330-344. Further, the antenna may be configurable to have any desirable number of sectors, such as it may additionally have sectors 346-360. In any such antenna, minimum of 4 sectors may be used, and maximum, as desired number of sectors may be used for moving object detection. Further, in order to detect the moving object using two such sectored antennas, corresponding sectors of the two antennas may be correlated (the peaks of their delay-rate spectrums) to determine the approximate location and state of motion of the moving object. For correlation each peak of a sector is moved in delay and rate of the other sector and then cross-correlation is performed. If a correlation coefficient of the resulting correlation is more than a threshold correlation value, such as 50% as an example, the peaks are considered to be from the same source. As a result, detection proceeds by moving in the directions of correlated sectors of each system or antenna, and wherever the two directions intersect, that point of intersection provides the approximate location of the source or the moving object. Further the directions obtained by the delay-rate spectrums of the two systems improve the accuracy of the detected location as that gives a particular angle. For example, if the correlated sectors of two systems are in the upper 45 degrees of the sectored antennas, then q in FIG. 1A denotes elevation of the line from each correlated sector of the two systems, else if the correlated sectors are in the lower 45 degrees, then q is azimuth of the line from each correlated sector of the two systems. For correlation all channels of the receivers must be local oscillator synchronized.

The system 200 or 300a or 300b shown by geometrical configurations shown in FIG. 2, FIG. 3A and FIG. 3B are also able to provide false alarm mitigation.

If a false alarm is generated by people movement at height above an antenna location, say in a balcony or terrace in the vicinity of a radio source then that can be mitigated by looking at the delay-rate spectrum. The delay-rate spectrum is configured to classify actual moving sources and noise based on signal strength and delay spread, as described in conjunction with FIGS. 2 and 3A-3B above. Thus, reflections from people are unlikely to be 50% of the main source which we are considered as the cutoff so they will be filtered off. Similarly, reflections from birds may be filtered off.

The sources, such as moving objects or targets, are detected with a delay resolution of say 10 ns, that is a sampling rate of 100 MHz, and further 20 MHz bands are filtered out. which is usually the bandwidth of drone communication. The bandwidth of drone communication is generally not less than this number because bandwidth affects communication speed every commercial drone has 20 MHz bandwidth. If the bandwidth is more than 20 MHz, then also this technique would work even if only 20 MHz out of the total bandwidth sampled is picked. However, any other suitable bandwidth for filtering may be used alternately, without deviating from the scope of the present disclosure.

In some embodiments, the sources of interference if present at heights above or same as the antenna outside the buildings in open area then the only source of moving reflections are the birds and the airplanes. Again, the reflections would not be substantial if the flying object is far from the source and not in all cases these would be reaching the receiving antenna especially for birds whose surface area is small. However, if there is a flock of birds then there can be a false alarm but not many times a flock of birds is seen crossing a particular area in a day near the antennas. So even if such moving objects are there the number of occurrences may be small and be easily mitigated, thus providing a highly accurate system for moving object detection.

Figure 4:
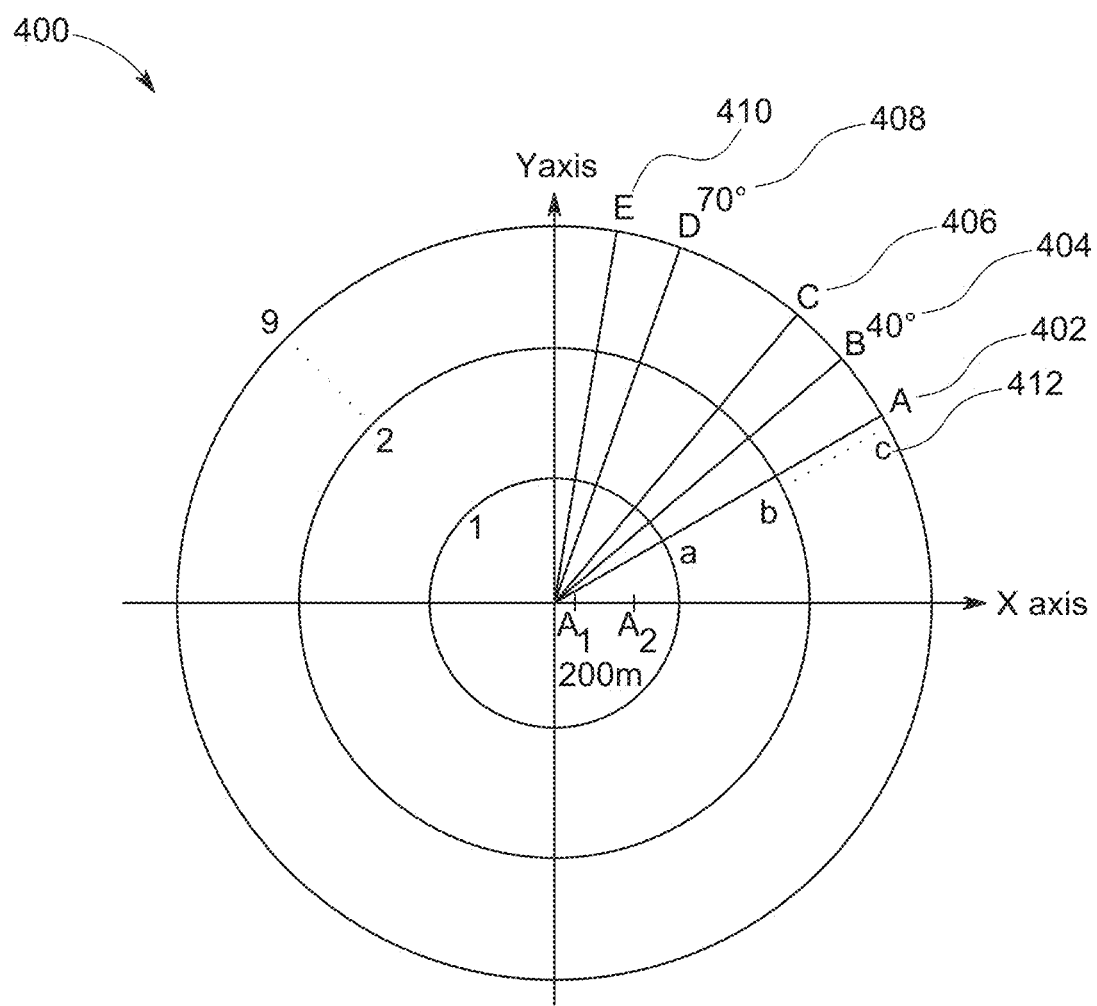
FIG. 4 is a schematic diagram of a directional arrangement of arrival pattern of drone for detecting the moving object, according to an embodiment of the present disclosure.

FIG. 4 is a schematic diagram of a directional arrangement 400 of the antennas arrival pattern of drones, for detecting the moving object, according to an embodiment of the present disclosure.

As shown in FIG. 4, the whole space from which a moving object or drone may arrive is divided into directions, as specified by lines joining any two points between A, B, . . . , E, a, b, . . . , c, each circle representing a span from 0 to 360 degrees. The two antennas, such as antennas 202 and 204, are placed at locations A1 and A2. The concentric circles represent points that vary in terms of distance of the moving object from the baseline, starting from 3 km up to 300 m. Then we see what the delay changes look like when we move from one point to another. Points 402, 404, 406, 408, and 410 show the different positions of the moving object. We have seen for the first point c, 412, at 3 km to second point at 2.7 km the delay difference is a little less than 10 ns but at 2.4 km the delay difference is near 20 ns. Nearer the moving object comes more is the delay difference between any two consecutive points. So, if the data of the moving object is sampled when the radio source (that is the moving object) is somewhere and then sampled again after a certain time allowing it to move sufficiently then, a difference in the position of the delay peak is observed. This will be illustrated in detail in FIGS. 5A-5B.

In various embodiments, the moving object also shows angular movement with respect to the baseline. So even if 2.5 degrees of angular movement is there that would generate noticeable delay difference between the two positions of the moving object. The method used to find delay differences is as follows A) An x, y, z positions of the drone and the two antennas, A1 and A2, is defined B) The antennas are located in an arbitrary x axis at 300 m(A1) and 500 m (A2)

C) The drone is positioned on different angles as shown by the lines A, B, C, D, E, and points 402, 404, 406, 408, and 410, and also on different points in the same line as shown by a, b, c . . . in FIG. 4

D) The distance of the drone from each antenna for every position is obtained

E) For each position, the distances between the drone and each antenna are divided by c (speed of light) and so two delays td1 and td2 are obtained F) Subtraction td1−td2 to get the delay of the interferometer response is performed G) This delay of the interferometer response is then found for each of the points a, b, c . . . .

Using the steps, A-G above, it may be observed that the delay difference between the first point, a, and the others is found more than 10 ns for most cases except the point just after the first one that is the time delay difference between the point at 3000 m and point at 2700 m in a particular direction is little less than 10 ns, but other points show a delay difference of more than 10 ns when compared to the first point.

However, if the direction is also changed, and delay difference is measured between two points lying in two directions, such as between points 402 and 404, separated by say 10 degrees, then a significant delay difference between the two points is observed and practically direction should change.

In some embodiments, the baselines are several in number if we place antennas along X axis −100 m, 100 m, 300 m, 500 m and along Y axis the same then the simulation shows that this geometry, such as similar to as illustrated in FIG. 3A will be able to detect drones flying in any path. For example, if antennas are placed at 300 m and 500 m along X axis then start at 3000 m from the origin in a direction at 40 degrees with the x axis and then the next points are 300 m nearer and nearer, and corresponding time delays may be obtained for interferometer.

In some embodiments, if the baseline is displaced from the origin, the delay differences are more prominent. Thus, if a drone is arriving making an angle whose vertex does not align with any of the two antennas, then the delay difference between successive points are more prominent. Further antenna geometry of FIG. 3A-3B ensures that if in one baseline delay difference is inadequate then in other it is.

Figure 5A:
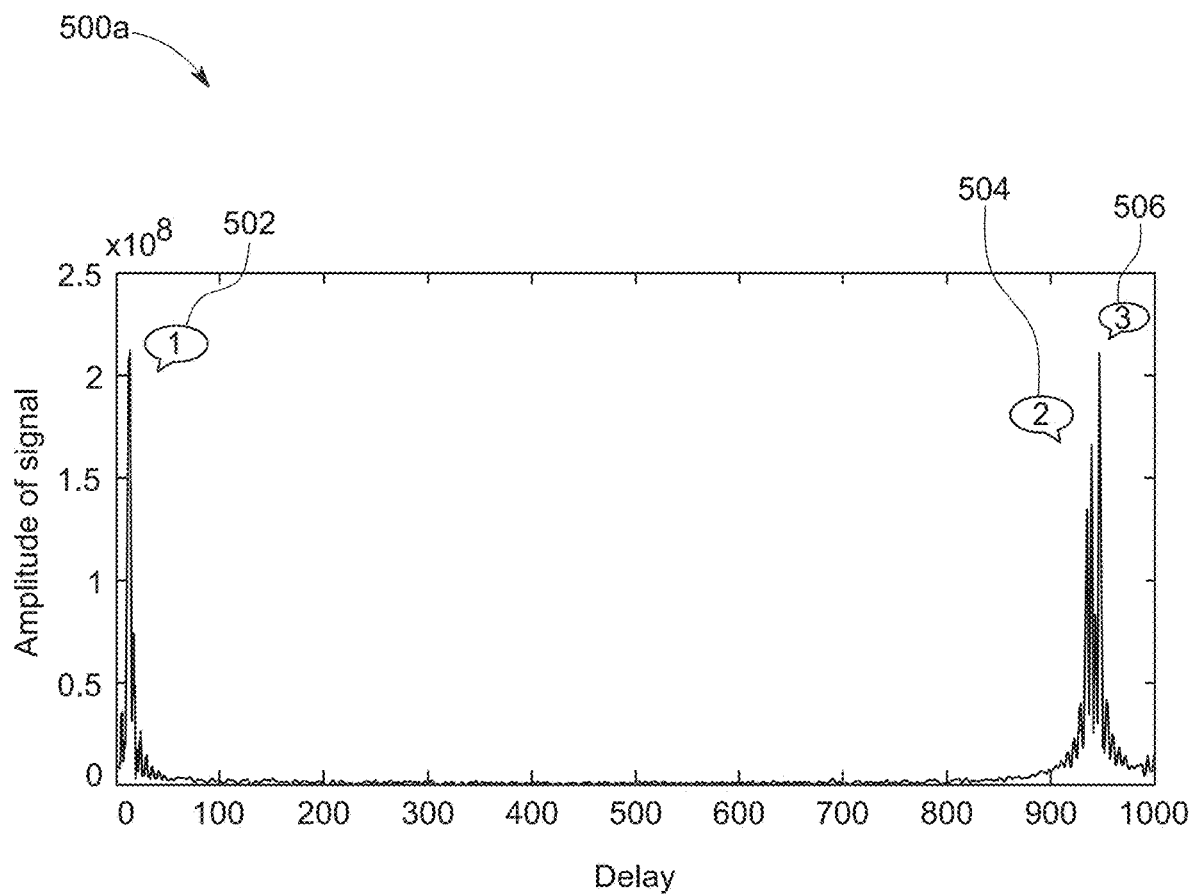
FIGS. 5A and 5B illustrate a graphical simulation of a scenario for detection of a moving object, according to an embodiment of the present disclosure.
Figure 5B:
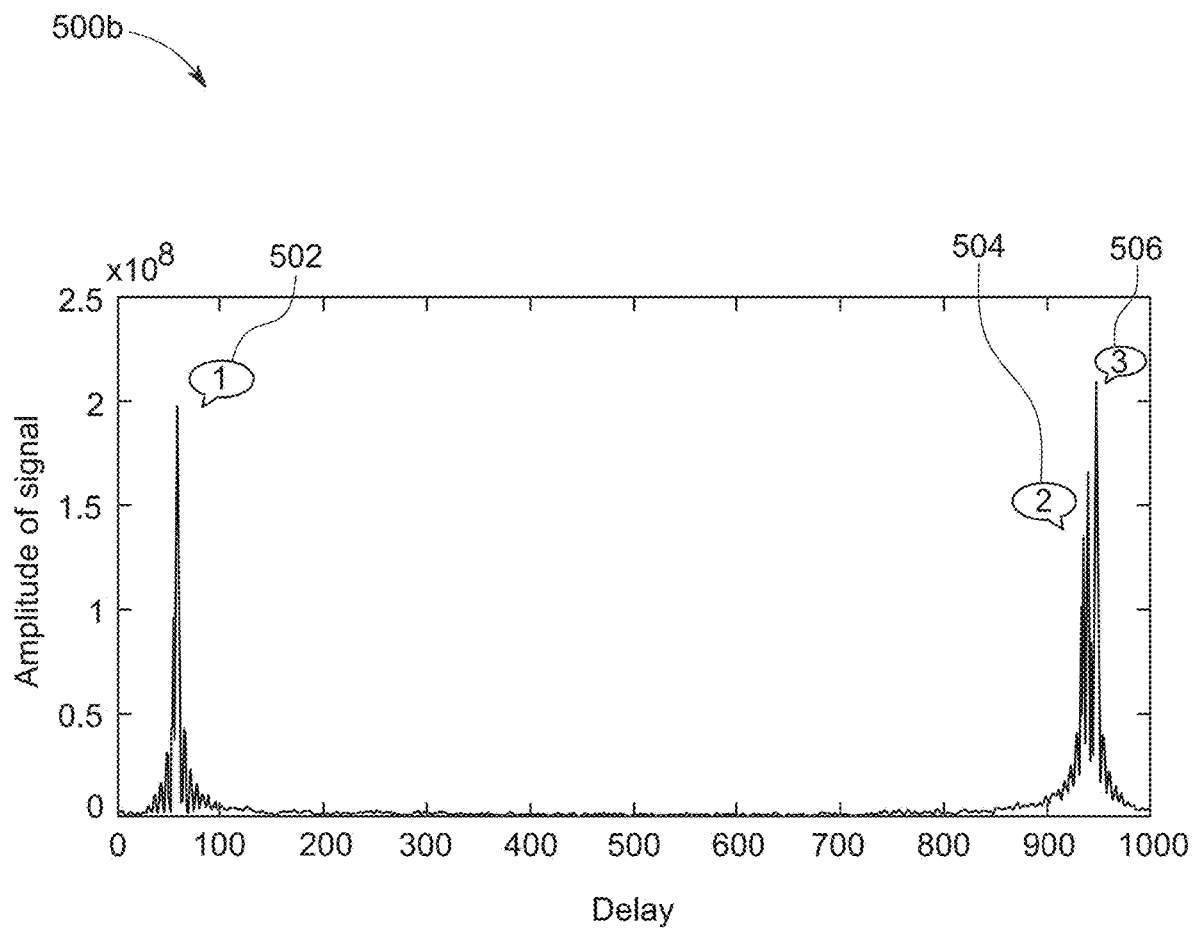

These delays and rates may be used to determine a delay-rate spectrum, as illustrated in FIGS. 5A-5B.

FIGS. 5A-5B illustrate a graphical simulation of a scenario for detection of a moving object based on a delay-rate spectrum, according to an embodiment of the present disclosure. The FIGS. 5A-5B illustrate cross-sections of a single rate.

A delay-rate spectrum consists of a 2 D matrix where horizontal rows are functions of delay and vertical columns are functions of rate. Rate is fringe rate and delay is the delay of the cross-power spectrum or visibility function in the time domain. This delay is basically the path difference for the source, that is the moving object, between the two antennas, such as the first antenna 202 and the second antenna 204 illustrated in FIG. 2, divided by the speed of light. If we have many sources the advantage of using this method is that we can separate every source in the delay space so every source whether stationary or moving or multiple stationary sources, all can be separated from each other, and their characteristics can be tracked. So, the sources that are stationary will produce the peak in the same delay position when the data is taken at different instants of time and at 0 rate column whereas the position of the peak for a moving source will keep changing with time and will have a non-zero rate which can be known from rate data.

For obtaining the delay and rate data, a sampling rate of 100 MSps may be used and then 1 million data samples from the two antennas per second are received and a bandwidth of 20 MHz, which is the drone communication bandwidth, is filtered out. Then chunks of data are formed, that is the data is divided into 1000 chunks having 1000 samples each. Then each chunk from one antenna (such as antenna 202) is cross correlated with each chunk from the other antenna (such as antenna 204), using a mathematical correlation function. The mathematical correlation function may be the conjugate function, thus each chunk from one antenna (such as antenna 202) is cross correlated with a conjugate of corresponding chunk from the other antenna (such as antenna 204) in the frequency domain. This way, 1000 cross-power spectrum each having 1000 samples may be obtained.

Further, a 2D FFT is performed to get the delay-rate spectrum. As a result, a matrix of 1000×1000 data in the delay-rate space is obtained. The horizontal rows are delays and vertical columns are rates. That is since there are 1000 samples in a row and the spacing is the delay resolution which is 1/100e6=10 ns, the span being baseline length divided by speed of light. Similarly for the rate space the resolution is defined by the inverse of the total time span of the data. Since the data has collected 1e6 data at 100 MSps, this means the collected data for 1 e6/100e6=0.01 seconds is obtained. Then the rate resolution will be 1/0.01=100 Hz. And the span is 100 Hz×1000=100 Khz This data may be used to obtain a delay-rate plot followed by a 2D FFT, having a is magnitude of the values, or the amplitude, versus the 1000 points with each point representing the delay in ns. In this plot, as illustrated in FIG. 5A, peaks, 502, 504, and 506 are observed at points where there are stationary sources or sources whose movement does not produce more than 100 Hz Doppler or there are moving objects. These sources are shown as 1, 2, and 3. The delay positions of the stationary sources will remain constant with time at zero rate but will vary for moving sources as described earlier with some rate value so it may be identified if some moving source is there or not.

FIG. 5B illustrates that the positions of peaks 504 and 506, corresponding to sources 2 and 3 respectively are fixed whereas the position of peak 502 corresponding to source 1 has changed.

The example shown in FIGS. 5A and 5B, is for detection drones producing at least 100 Hz Doppler shift but for slower drones, the same above method but for 1 s data or 1 Hz Doppler or rate resolution and 100000*1000 data in the matrix may be equivalently used.

Finally with this method angle q of FIG. 1 of the moving object is also detected depending on whether signal is received from lower sector antenna/upper sector antenna to find the drone.

Figure 6:
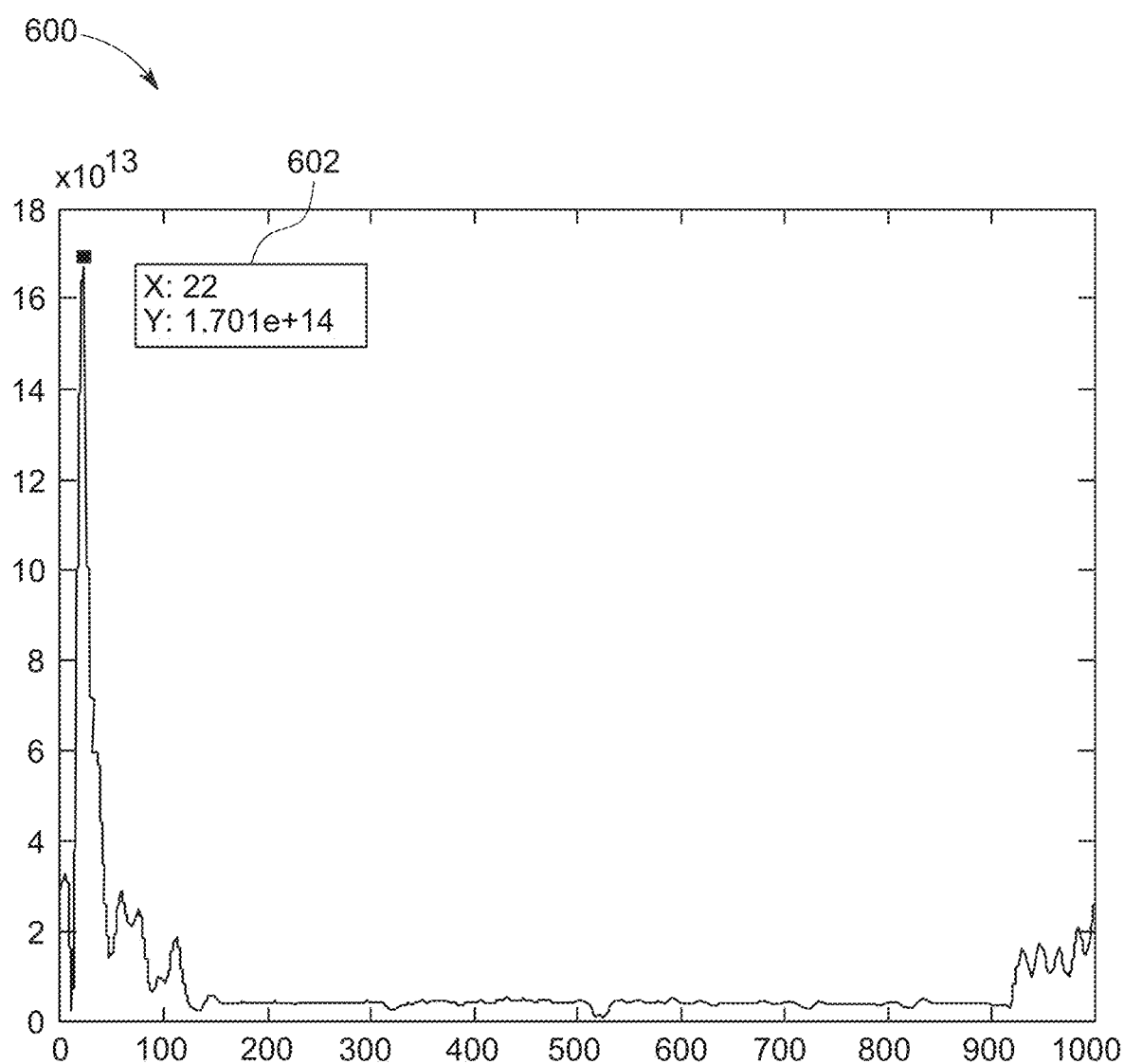
FIG. 6 illustrates a graphical simulation of a delay-rate spectrum for detection of the moving object, according to an embodiment of the present disclosure.

FIG. 6 illustrates a graphical simulation of a delay-rate spectrum 600 for detection of the moving object, according to an embodiment of the present disclosure.

FIG. 6 shows the peak due to signal from the moving object as a function of delay for 0 rate. The value of delay where the peak landed is 22 or 22nd pixel for rate=0, which is expected as the moving object was stationery and delay was 106.67 ns (baseline length/velocity of light), the moving object being kept aligning the baseline that is at 0 degrees wrt the baseline plus 94 ns corresponding to the cable length differences, which is equal to 200.67 ns. The resolution being 10 ns, the delay should land up in 20th pixel and as expected, a peak 602, was obtained at 22nd pixel, which is acceptable considering some delays in RF components.

Figure 7:
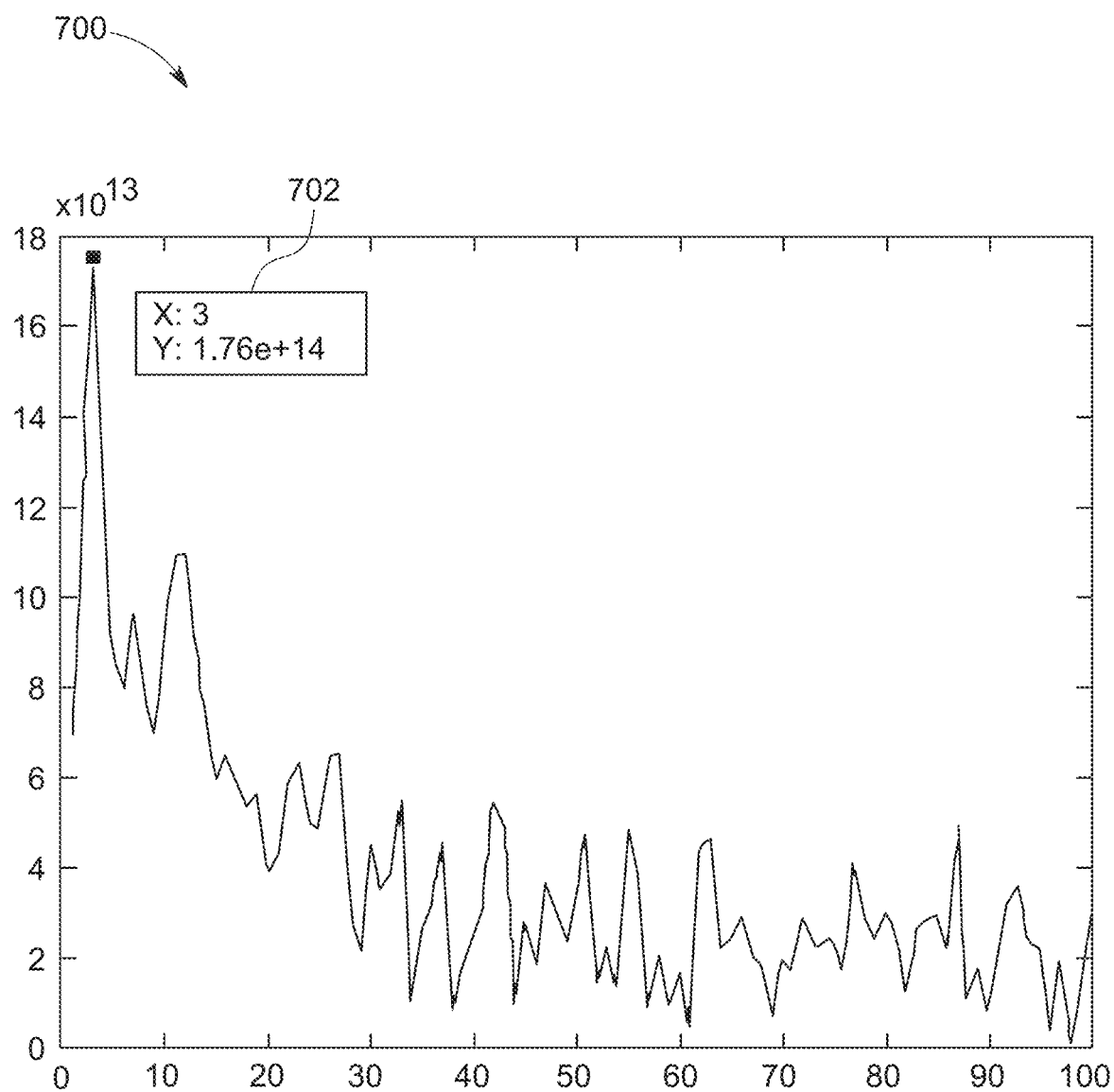
FIG. 7 illustrates another graphical simulation of a delay-rate spectrum for detection of the moving object, according to an embodiment of the present disclosure.

FIG. 7 illustrates another graphical simulation of a delay-rate spectrum 700 for detection of the moving object, according to an embodiment of the present disclosure. This shows amplitude as a function of rate for a particular delay.

In the example shown in FIG. 7, the moving object shown in FIG. 6 was flown, and it was observed that the rate was greater than 0 indicating motion as was observed where X axis represents rate for delay value, which equals the delay of the signal from the baseline. The first peak 702 was detected at pixel value of X=3.

Further to identify more than one moving source in the same frequency band we use the delay information. Experimentally, it has been observed that a single moving source can spread its harmonics in the delay direction by +−4 pixels with speeds and observation duration in consistent what we described previously. So, if sufficient (50% of main peak) signal is observed beyond +−4 pixels for a single frequency band then we conclude that there is a second source though multiple drones are unlikely to use same frequency band as interference would be a problem for their communication.

Figure 8:
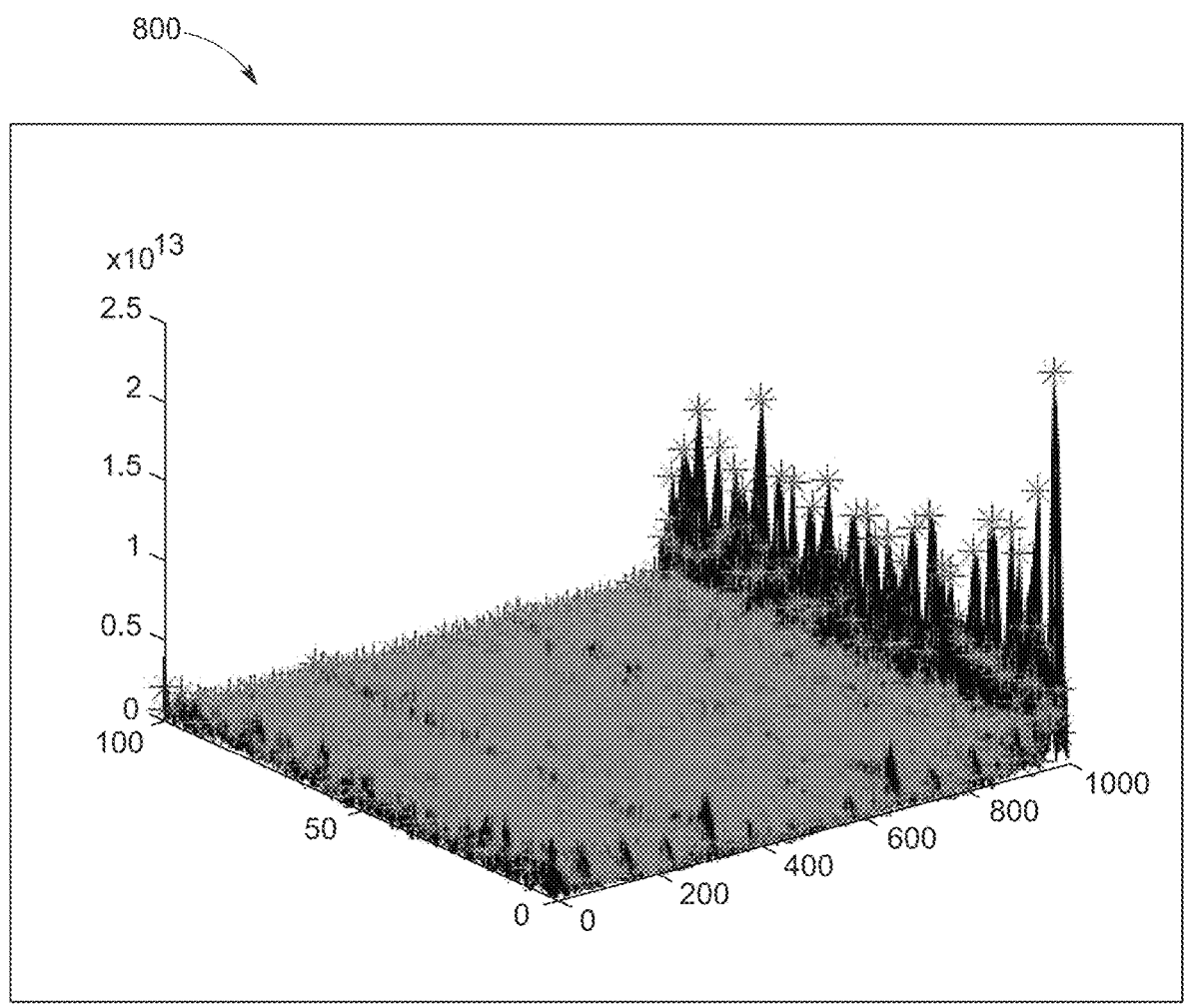
FIG. 8 illustrates a graphical simulation of a delay-rate spectrum including X, Y, and Z-axis for detection of the moving object, according to an embodiment of the present disclosure.

FIG. 8 illustrates a graphical simulation of a delay-rate spectrum 800 including X, Y, and Z-axis for detection of the moving object, according to an embodiment of the present disclosure.

In FIG. 8, a 3D image with delay in X axis, rate in Y axis and amplitude in Z axis shown. The maximum is in rate 3 where resolution is 10 Hz, which means the rate is 30 Hz. The drone was flown 20 m away from the baseline center. This rate indicates that the source is moving. Further smaller peaks in other rates which are harmonics of the main signal are also observed.

Figure 9:
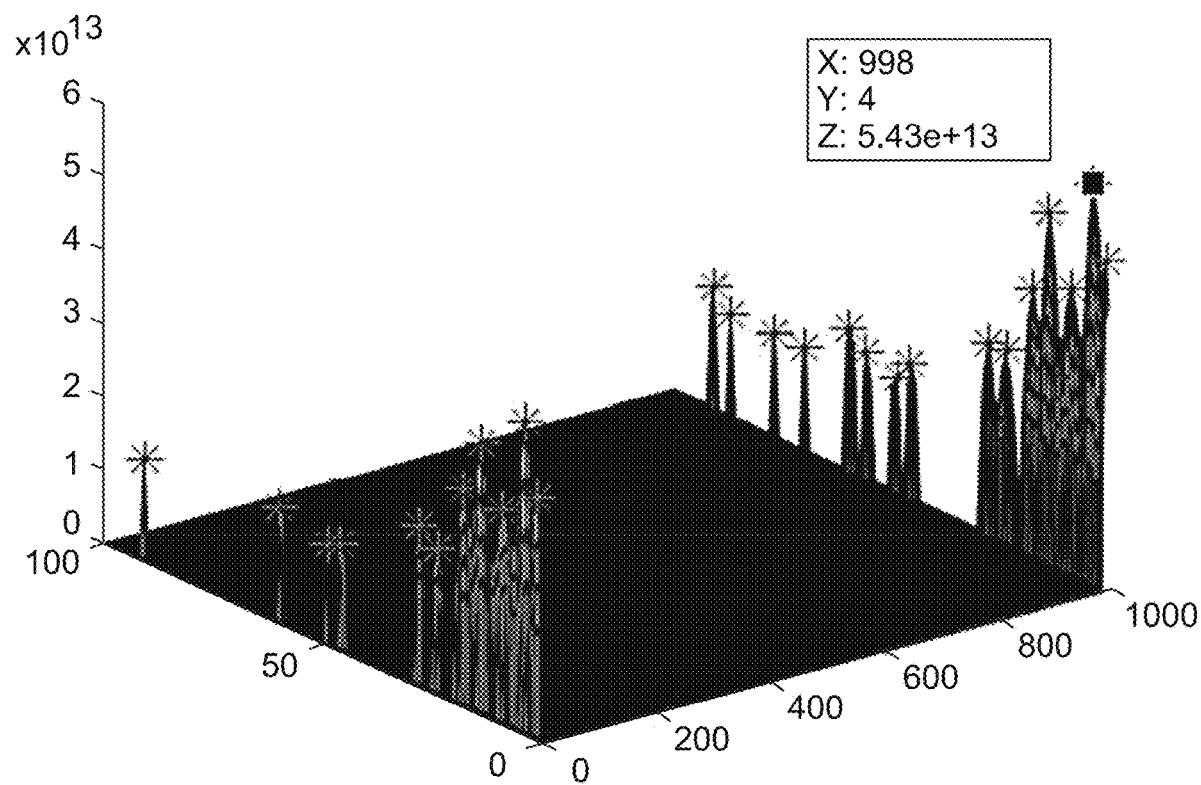
FIG. 9 illustrates another graphical simulation of a delay-rate spectrum including X, Y, and Z-axis for detection of the moving object, according to an embodiment of the present disclosure.

FIG. 9 illustrates another graphical simulation of a delay-rate spectrum 900 including X, Y, and Z-axis for detection of the moving object, according to an embodiment of the present disclosure.

In FIG. 9, a threshold of maximum/2 for the amplitude is considered. All peaks in FIG. 9 have delays in the +−4 pixel range from the most significant peak so that is the condition when signal is from same source. Thus, using the same analysis, the presence of one or more sources from 3D image of the delay-rate spectrum may be obtained.

For example, considering from FIG. 9 that delay is 998. Further assuming that the delay-rate spectrum 900 was obtained using the configuration of antennas, such as antennas 324, 328 and systems 326, 300b shown in FIG. 3B. Further, considering that we correlated using the antenna 324 with antenna 328, then if the delay is nearer to 1000 than 0 then the source direction is as shown in FIG. 1B. However if the delay is nearer to 0 then direction is as in FIG. 1A. Further, considering the baseline is 60 m long in the both the scenarios depicted in FIG. 3B, so maximum delay difference of the correlator output is $60/(3*10^8)=200$ ns that means 20 pixels or 0 to 19 if source lies nearer to antenna 328 than antenna 324 and 1000 down to 981 if source lies nearer to antenna 324 than antenna 328.

Further, it may be observed that Sin q=P_d/D; P_d=delay/c. So we get q. Delay is 1000−998=2 pixels or 20 ns since 1 pixel=10 ns. As we know the baseline length, thus we may obtain the value of q. By using sectored antennas that is dividing the whole 360 degrees space into sectors by using antenna as mentioned in FIG. 3C we correlate corresponding sectors of antenna 324 and antenna 328 and we know then which pair of sectors indicate motion and thus from the directionality of the sector we get the direction of the source and from the delay we get exact direction within the sector. Thus, using more systems like the configuration shown in FIG. 3B and FIG. 3C, such that the other system's (such as system 326) baseline is perpendicular to the baseline of first system (such as system 320), as in FIG. 3B, the location of the moving object may be obtained.

That is suppose system 320 gives 5 peaks above threshold and system 326 gives 7 peaks above threshold, then each peak of system 320 is correlated with each peak of system 326 and the correlation coefficient is determined. A correlation coefficient which is equal to or more than a threshold correlation value, such as 50%, identifies that the two correlated peaks are from the same source. And then we move along the two beams of the two corresponding sectors of the two antennas (such as antennas 318 and 322) that showed the peaks to get the approximate location or lat, long coordinates.

In an example, to automate peak detection rather by observing image manually, a function known to a person of ordinary skill in the art may be used. For example, the imageregionalmax function of MATLAB™ and its equivalent C++™ code is such an industry known example. These and other equivalent functions may help in determining a regional maxima associated with the peak values in the delay rate spectrum images. The regional maxima in the image may denote a connected component of pixels whose values are all higher than the neighborhood of the maxima.

Figure 10:
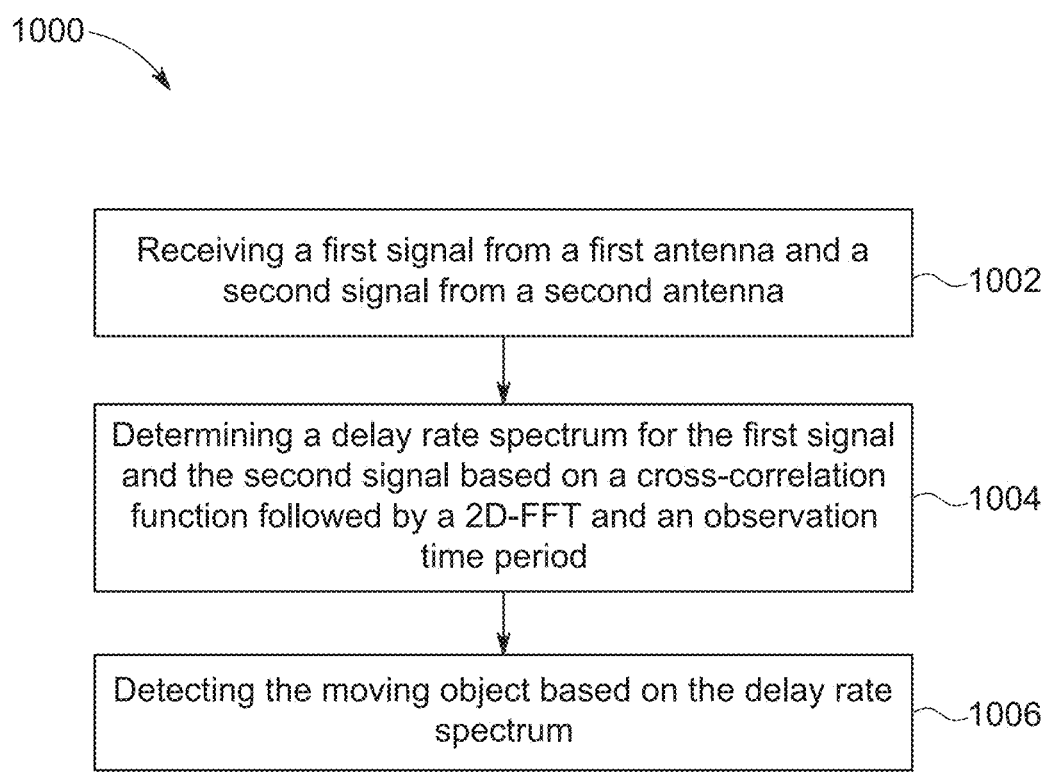
FIG. 10 illustrates a method for detecting a moving object, according to an embodiment of the present disclosure.

Detection of moving object in this manner is further elaborated in a method shown in FIG. 10.

FIG. 10 illustrates a method 1000 for detecting a moving object, according to an embodiment of the present disclosure.

The method 1000 comprises, at 1002, receiving a first signal from a first antenna, such as the antenna 102a, and receiving a second signal from a second antenna, such as the antenna 102b. RF signals transmitted from RF sources, such as moving objects are detected by the antennas 102a and 102b, and that detection is used to trigger the operation of the processing module 104 by sending the first signal and the second signal. For example, using any of the geometrical configurations shown in FIGS. 2-4, the RF signal from the moving subject is detected. Also, the received signal is obtained at a sampling rate and an observation period.

Further, at 1004, a delay-rate spectrum for the first signal and the second signal is determined based on a cross-correlation function and an observation time period. The delay-rate spectrum is determined based on the signal and data chunks received from the moving object, as illustrated in FIG. 4, FIG. 5A, and FIG. 5B and FIG. 9. FIG. 5A and FIG. 5B are the plots of amplitude versus delay for a particular rate, which is zero in this case.

Once the delay-rate spectrum has been determined, at 1006, the moving object may be detected using the peaks in the delay-rate spectrum, as illustrated in FIGS. 5A, 5B, 6, 7, and 8.

The detection of the moving object may include determining any of location coordinates and direction of the moving object, as discussed in various embodiments described above, specifically using the configuration shown in FIG. 3B, and using the correlation of peaks.

Thus, using the methods and systems provided herein, moving objects such as drones may be detected with greater accuracy, precision, and with suitable observation times as per the speed of the moving object. The methods and systems disclosed herein may be used to detect moving drones having wide range of speeds and can localize the moving object accurately and tell its movement and location. The whole delay-rate spectrum is divided into bands. Each band of interest is visited intermittently, and the delay-rate spectrum is calculated to observe changes in the peaks due to moving sources and if the source does not produce change in delay like in radial movement, it can still be detected from movement in rate value. Further, multiple moving objects can also be detected by using a delay separation of maximum +−4 pixels even for their harmonics spread in delay in the rate direction and the peaks that are >=½ of the maximum peaks are considered In some embodiments, if number of peaks which are greater than or equal to ½ of the maximum peak exceeds 15 and number of distinct delays detected for the peaks exceeds 32 (assuming it is possible to detect 4 moving sources in a single band and each of their delays can deviate by +−4 pixels) or within 32 but any eight do not form a set within +−4 pixels then, that is taken as noise. This is based on experimental data that harmonics which are 50% of the main peak can be assumed to be not greater than 15 in number for the speed (fast, intermediate, and slow drones) and corresponding time of observation if exceeded, which can be the case of multiple drones, the number of delays are observed to not to exceed 32, and any eight are in the vicinity of one by +−4 pixels. This way it is possible to detect 4 drones at once for a particular band.

The detection of moving objects in this manner may be used in a wide variety of applications such as surveillance systems, national security systems, moving airplanes, ships, and the like.

Thus, the various embodiments disclosed herein illustrate that the delay-rate spectrum if used with proper constraints of sampling time, baseline length of interferometer, observation times can be used to detect moving drones having wide range of speeds, can localize the moving source and tell its movement and location.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the disclosure. Presenting the above-described functions as being performed by a "system" is not intended to limit the scope of the present disclosure in any way but is intended to provide one example of the many embodiments of the present disclosure. Indeed, methods, systems, and apparatuses disclosed herein may be implemented in localized and distributed forms consistent with computing technology, including cloud computing systems.

It should be noted that some of the system features described in this specification have been presented as modules, in order to emphasize their implementation independence more particularly. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code, for instance, includes one or more physical or logical blocks of computer instructions that, for instance, are organized as an object, procedure, or function. Nevertheless, the executables of an identified module need not be physically located together but may include disparate instructions stored in different locations that, when joined logically together, include the module, and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the disclosure.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of various embodiments of the present disclosure, as generally described and illustrated in the figures herein, may be arranged and designed in a wide variety of different configurations. Thus, the detailed description of the embodiments of the present disclosure, as represented in the attached figures, is not intended to limit the scope of the disclosure as claimed but is merely representative of selected embodiments of the disclosure.

The features, structures, or characteristics of the disclosure described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present disclosure. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

One having ordinary skill in the art will readily understand that the disclosure as discussed above may be practiced with steps in a different order, and/or with hardware elements in configurations which are different than those which are disclosed. Therefore, although the disclosure has been described based upon these preferred embodiments, it would be apparent to those of skill in the art that certain modifications, variations, and alternative constructions would be apparent, while remaining within the spirit and scope of the disclosure. In order to determine the metes and bounds of the disclosure, therefore, reference should be made to the appended claims.

We is claimed is:

1. A system for detecting a moving object, comprising:
a detector module comprising at least two antennas: a first antenna and a second antenna, wherein the first antenna and the second antenna are separated by a baseline distance;
a processing module comprising one or more processors, the processing module configured to:
receive a first signal from the first antenna and a second signal from the second antenna, wherein each of the first antenna and the second antenna is a sectored antenna and are located at a predetermined height from ground level, and wherein each of the first antenna and the second antenna have zero response below the predetermined height;
determine a delay-rate spectrum for the first signal and the second signal based on a cross-correlation function followed by a 2D fast Fourier transform (2D FFT) and an observation time period, wherein the cross-correlation function comprises determining at least a delay, a rate, or a combination thereof, between the first signal and the second signal based on a mathematical correlation function, and the observation time period comprises at least a slow object time period and a fast object time period, wherein the delay-rate spectrum comprises at least a plot of a delay value and an amplitude value or at least a plot of a Doppler rate value and the amplitude value, wherein the moving object is detected based on peak values in the plot, the peak values in the plot are determined using a regional maxima associated with the peak value, wherein the correlation function is performed between the corresponding sectors of the first antenna and the second antenna, and wherein a location of the moving object is detected based on the correlation between peaks of the delay rate spectrums of the corresponding sectors of the first antenna and the second antenna, when the mathematical correlation function indicates a correlation coefficient equal to one or more than a threshold correlation value; and
detect the moving object based on the determined delay-rate spectrum, wherein detecting the moving object further comprises determining one or more of a location coordinate information of the moving object, an angular position of the moving object, and a movement of the moving object.

2. The system of claim 1, wherein the first signal and the second signal comprise signals received by the first antenna and the second antenna respectively as transmitted from the moving object.

3. The system of claim 1, wherein the baseline distance comprises a configurable distance value corresponding to a distance of separation between the first antenna and the second antenna.

4. The system of claim 1, wherein the delay rate spectrum comprises a plurality of bands of frequencies, wherein each band is of a predefined frequency range.

5. A method for detecting a moving object comprising:
receiving a first signal from a first antenna and a second signal from a second antenna, wherein each of the first antenna and the second antenna is a sectored antenna and are located at a predetermined height from ground level, and wherein each of the first antenna and the second antenna have zero response below the predetermined height;
determining a delay rate spectrum for the first signal and the second signal based on a cross-correlation function followed by a 2D fast Fourier transform (2D FFT) and an observation time period, wherein the cross-correlation function comprises determining at least a delay, a rate, or a combination thereof, between the first signal and the second signal based on a mathematical correlation function, and the observation time period comprises at least a slow object time period and a fast object time period, wherein the delay-rate spectrum comprises at least a plot of a delay value and an amplitude value or at least a plot of a Doppler rate value and the amplitude value, wherein the moving object is detected based on peak values in the plot, the peak values in the plot are determined using a regional maxima associated with the peak value, wherein the correlation function is performed between the corresponding sectors of the first antenna and the second antenna, and wherein a location of the moving object is detected based on the correlation between peaks of the delay rate spectrums of the corresponding sectors of the first antenna and the second antenna, when the mathematical correlation function indicates a correlation coefficient equal to one or more than a threshold correlation value; and
detecting the moving object based on the delay rate spectrum, wherein detecting the moving object further comprises determining one or more of a location coordinate information of the moving object, an angular position of the moving object, and a movement of the moving object.

* * * * *